United States Patent
Noel et al.

(10) Patent No.: US 12,231,447 B2
(45) Date of Patent: Feb. 18, 2025

(54) GRAPH ANALYTICS AND VISUALIZATION FOR CYBER SITUATIONAL UNDERSTANDING

(71) Applicant: The MITRE Corporation, McLean, VA (US)

(72) Inventors: Steven E. Noel, Woodbridge, VA (US); Man M. Sapra, Aldie, VA (US); Stephen F. Purdy, Springfield, VA (US); Jeremy T. Martin, Bel Air, MD (US); Mandira D. Hegde, Rosedale, MD (US); Brianna L. Chen, Arlington, VA (US)

(73) Assignee: THE MITRE CORPORATION, McLean, VA (US)

( * ) Notice: Subject to any disclaimer, the term of this patent is extended or adjusted under 35 U.S.C. 154(b) by 475 days.

(21) Appl. No.: 17/496,519

(22) Filed: Oct. 7, 2021

(65) Prior Publication Data
US 2023/0111177 A1    Apr. 13, 2023

(51) Int. Cl.
*H04L 29/06*    (2006.01)
*G06N 5/02*    (2023.01)
*H04L 9/40*    (2022.01)

(52) U.S. Cl.
CPC ........... *H04L 63/1425* (2013.01); *G06N 5/02* (2013.01)

(58) Field of Classification Search
CPC .............................. H04L 63/1425; G06N 5/02
See application file for complete search history.

(56) References Cited

U.S. PATENT DOCUMENTS

| | | | |
|---|---|---|---|
| 7,530,105 B2 | 5/2009 | Gilbert et al. | |
| 7,624,448 B2 | 11/2009 | Coffman | |
| 8,468,244 B2 | 6/2013 | Redlich et al. | |
| 10,313,382 B2 | 6/2019 | Noel et al. | |
| 10,521,747 B2 | 12/2019 | Warner et al. | |
| 10,609,059 B2 | 3/2020 | Apostolopoulos | |
| 10,630,704 B1 | 4/2020 | Ghosh et al. | |
| 10,630,716 B1 | 4/2020 | Ghosh et al. | |
| 10,771,492 B2 | 9/2020 | Hudis et al. | |
| 10,887,337 B1 | 1/2021 | Kim et al. | |
| 2017/0280107 A1* | 9/2017 | Wood .................... | G06V 20/52 |

(Continued)

OTHER PUBLICATIONS

U.S. Army Training and Doctrine Command (TRADOC), "The U.S. Army Operating Concept: Win in a Complex World," (2020-2040). Pamphlet 525-3-1. TRADOC; 2014; Retrieved Oct. 7, 2021; 56 pages.

(Continued)

*Primary Examiner* — Jeffrey C Pwu
*Assistant Examiner* — Thong P Truong
(74) *Attorney, Agent, or Firm* — Sterne, Kessler, Goldstein & Fox P.L.L.C.

(57) ABSTRACT

Disclosed herein are system, method, and computer program product embodiments for creating cyber situational understanding in an operational environment. An embodiment operates by normalizing streaming cyber information for a plurality of cyberspace entities and generating cyber-graphs based on relationships between two or more of the plurality of cyberspace entities. A cyber-threat inquiry of the cyber-graphs returns potential cyber-threats that are subsequently visualized as an overlay on a corresponding operational environment.

38 Claims, 13 Drawing Sheets

(56) References Cited

U.S. PATENT DOCUMENTS

| | | | |
|---|---|---|---|
| 2018/0159876 A1* | 6/2018 | Park | H04L 63/1425 |
| 2021/0019674 A1* | 1/2021 | Crabtree | G06V 30/274 |

OTHER PUBLICATIONS

Eimers J., "Prototype Cyber Software Delivers CEMA Dashboard to Tactical Commanders," [Online].; 2020 [cited Nov. 30, 2020. Available from: https://www.army.mil/article/238095/prototype_cyber_software_delivers_cema_dashboard_to_tactical_commanders; Retrieved Oct. 7, 2021; 3 pages.

Pomerleau M., "Army Gets Prototype for Cyber Visualization Tool," [Online].; 2020 [cited Nov. 30, 2020. Available from: https://www.c4isrnet.com/cyber/2020/08/14/army-gets-prototype-for-cyber-visualization-tool/; Retrieved Oct. 7, 2021; 6 pages.

U.S. Army Acquisition Support Center (USAASC), "Command Post Computing Environment (CPCE)," [Online].; 2020 [cited Dec. 1, 2020. Available from: https://asc.army.mil/ web/portfolio-item/command-post-computing-environment-cpce/; Retrieved Oct. 7, 2021; 5 pages.

Noel S, Harley E, Tam KH, Limiero M, Share M., "CyGraph: Graph-Based Analytics and Visualization for Cybersecurity," In Gudivada V, Raghavan V, Govindaraju V, Rao CR, editors. Cognitive Computing: Theory and Application, Handbook of Statistics 35.: Elsevier; 2016; Retrieved Oct. 7, 2021; 51 pages.

Noel S, Harley E, Tam KH, Gyor G., "Big-Data Architecture for Cyber Attack Graphs: Representing Security Relationships in NoSQL Graph Databases," In IEEE Symposium on Technologies for Homeland Security; 2015; Boston; Retrieved Oct. 7, 2021; 6 pages.

"The MITRE Corporation. Caldera™," [Online].; 2020 [cited Dec. 1, 2020. Available from: https://github.com/mitre/caldera; Retrieved Oct. 7, 2021; 4 pages.

Internet Engineering Task Force (IETF), "The LDAP Data Interchange Format (LDIF)—Technical Specification," [Online].; 2000 [cited Dec. 2, 2020. Available from: https://tools.ietf.org/html/rfc2849; Retrieved Oct. 7, 2021; 14 pages.

"Apache Kafka®: A Distributed Streaming Platform," [Online].; 2017 [cited Dec. 2, 2020. Available from: https://kafka.apache.org; Retrieved Oct. 7, 2021; 4 pages.

"Docker, Inc. Docker: Empowering App Development for Developers," [Online].; 2020 [cited Dec. 6, 2020. Available from: https://www.docker.com; Retrieved Oct. 7, 2021; 8 pages.

"The Apache Software Foundation. Apache ZooKeeper," [Online].; 2010-2020 [cited Dec. 7, 2020]. Available from: https://zookeeper.apache.org; Retrieved Oct. 7, 2021; 1 page.

Yahoo, "Cluster Manager for Apache Kafka," [Online].; 2020 [cited Dec. 7, 2020]. Available from: https://github.com/yahoo/CMAK; Retrieved Oct. 7, 2021; 12 pages.

Noel S., "A Review of Graph Approaches to Network Security Analytics," In From Databases to Cyber Security (Lecture Notes in Computer Science).: Springer; 2018; Retrieved Oct. 7, 2021; 24 pages.

The PostgreSQL Global Development Group, "PostgreSQL: The world's most advanced open source database," [Online].; 1996-2020 [cited Dec. 4, 2020]. Available from: https://www.postgresql.org/; Retrieved Oct. 7, 2021; 4 pages.

Neo4j, Inc, "Neo4j Graph Platform—The Leader in Graph Databases," [Online].; 2020 [cited Dec. 4, 2020]. Available from: https://neo4j.com; Retrieved Oct. 7, 2021; 15 pages.

OpenJS Foundation, "Node.js® is a JavaScript Runtime Built on Chrome's V8 JavaScript Engine," [Online].; 2020 [cited Dec. 4, 2020]. Available from: https://nodejs.org/; Retrieved Oct. 7, 2021; 1 page.

Internet Engineering Task Force (IETF), "The WebSocket Protocol," [Online].; 2011 [cited Dec. 4, 2020]. Available from: https://tools.ietf.org/html/rfc6455; Retrieved Oct. 7, 2021; 71 pages.

DiFonzo C, Noel S., "DeCypher: Human Machine Interaction for Graph-Based Cyber Situational Understanding," In publication review; 2020; Retrieved Oct. 7, 2021; 3 pages.

Neo4j, Inc, "Cypher Query Language," [Online].; 2020 [cited Dec. 4, 2020]. Available from: https://neo4j.com/developer/cypher/; Retrieved Oct. 7, 2021; 7 pages.

Seffers G., "U.S. Army Conducts Final Cyber Blitz," [Online].; 2020 [cited Dec. 7, 2020]. Available from: https://www.afcea.org/content/us-army-conducts-final-cyber-blitz; Retrieved Oct. 7, 2021; 3 pages.

Abney C., "Cyber Quest," [Online].; 2019 [cited 2020 Dec. 2020]. Available from: https://asc.army.mil/web/news-alt-ond19-cyber-quest/; Retrieved Oct. 7, 2021; 9 pages.

Douglas J., "Army Explores Network Resiliency during Annual Experiment," [Online].; 2020 [cited Dec. 7, 2020]. Available from: https://www.army.mil/article/237419/army_explores_network_resiliency_during_annual_experiment; Retrieved Oct. 7, 2021; 4 pages.

Program Executive Office Command Control Communications—Tactical (PEO C3T), "Tactical Network Initialization and Configuration," [Online].; 2020 [cited Dec. 7, 2020]. Available from: https://peoc3t.army.mil/i2s/tnic.php; Retrieved Oct. 7, 2021; 3 pages.

Tenable, "Tenable Network Security Named Assured Compliance Assessment Solution for the Defense Information Systems Agency," [Online].; 2012 [cited Dec. 3, 2020]. Available from: https://www.tenable.com/press-releases/tenable-network-security-named-assured-compliance-assessment-solution-for-the-defense; Retrieved Oct. 7, 2021; 5 pages.

Elastic. https://www.elastic.co/beats/winlogbeat. [Online].; 2020 [cited Dec. 3, 2020]. Available from: "Winlogbeat—Lightweight Shipper for Windows Event Logs," Retrieved Oct. 7, 2021; 3 pages.

"Splunk: The Data-to-Everything Platform Built for the Cloud," [Online].; 2005-2020 [cited Dec. 3, 2020]. Available from: https://www.splunk.com; Retrieved Oct. 7, 2021; 6 pages.

Palo Alto Networks, "NetFlow Monitoring," [Online].; 2020 [cited Dec. 3, 2020]. Available from: https://docs.paloaltonetworks.com/pan-os/8-1/pan-os-admin/monitoring/netflow-monitoring; Retrieved Oct. 7, 2021; 2 pages.

Multi-Service Tactics, Techniques, and Procedures (MTTP), "Tactical Chat: MTTP for Internet Tactical Chat in Support of Operations," 2009; Retrieved Oct. 7, 2021; 88 pages.

The MITRE Corporation, "MITRE ATT&CK®," [Online].; 2015-2020 [cited Dec. 7, 2020]. Available from: https://attack.mitre.org; Retrieved Oct. 7, 2021; 2 pages.

Heinbockel W, Noel S, Curbo J., "Mission Dependency Modeling for Cyber Situational Awareness," In NATO IST-148 Symposium on Cyber Defence Situation Awareness; 2016; Sofia; Retrieved Oct. 7, 2021; 14 pages.

Noel S, Bodeau D, McQuaid R., "Big-Data Graph Knowledge Bases for Cyber Resilience," In NATO IST-153 Workshop on Cyber Resilience; 2017; Munich; Retrieved Oct. 7, 2021; 16 pages.

U.S. Army, "Engineers Highlight Importance of Field-Based Experimentation, Like NetModX, on 'CCDC in the Lab'" [Online].; 2019 [cited Dec. 7, 2020]. Available from: https://www.army.mil/article/225812/engineers_highlight_importance_of_field_based_experimentation_like_netmodx_on_ccdc_in_the_lab; Retrieved Oct. 7, 2021; 2 pages.

Martin; W. J. et al., "Cyberspace Situational Understanding for Tactical Army Commanders The Army Is Swinging for the Fence, but It Just Needs a Single," Cyberspace Understanding, Military Review, 18-24, United States(2016).

* cited by examiner

GRAPH ANALYTICS AND VISUALIZATION FOR CYBER SITUATIONAL UNDERSTANDING

STATEMENT REGARDING FEDERALLY-SPONSORED RESEARCH AND DEVELOPMENT

The U.S. government has a paid-up license in this invention and the right in limited circumstances to require the patent owner to license others on reasonable terms as provided for by the terms of Contract No. W56KGU-18-D-0004 awarded by the United States Army.

CROSS-REFERENCE TO RELATED APPLICATIONS AND INCORPORATION BY REFERENCE

This application incorporates, by reference, U.S. Pat. No. 7,617,185, issued Nov. 9, 2009, entitled "Methods And Systems For Providing A Visualization Graph" in its entirety.

BACKGROUND

Analyzing mobile device information from a multitude of sources rapidly is challenging, especially when presented with a complex environment that may include cyber-assets located across land, air, maritime, space, and cyberspace domains. In the current state of practice, decision makers often lack insight into the cyberspace domain, especially how activities in cyberspace relate to elements across other operational domains and may impact overall operational objectives. A lack of cyber situational understanding can translate to an inability to respond effectively to threats, such as unauthorized access/control, spamming, hacking and other cyberspace encroachments.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
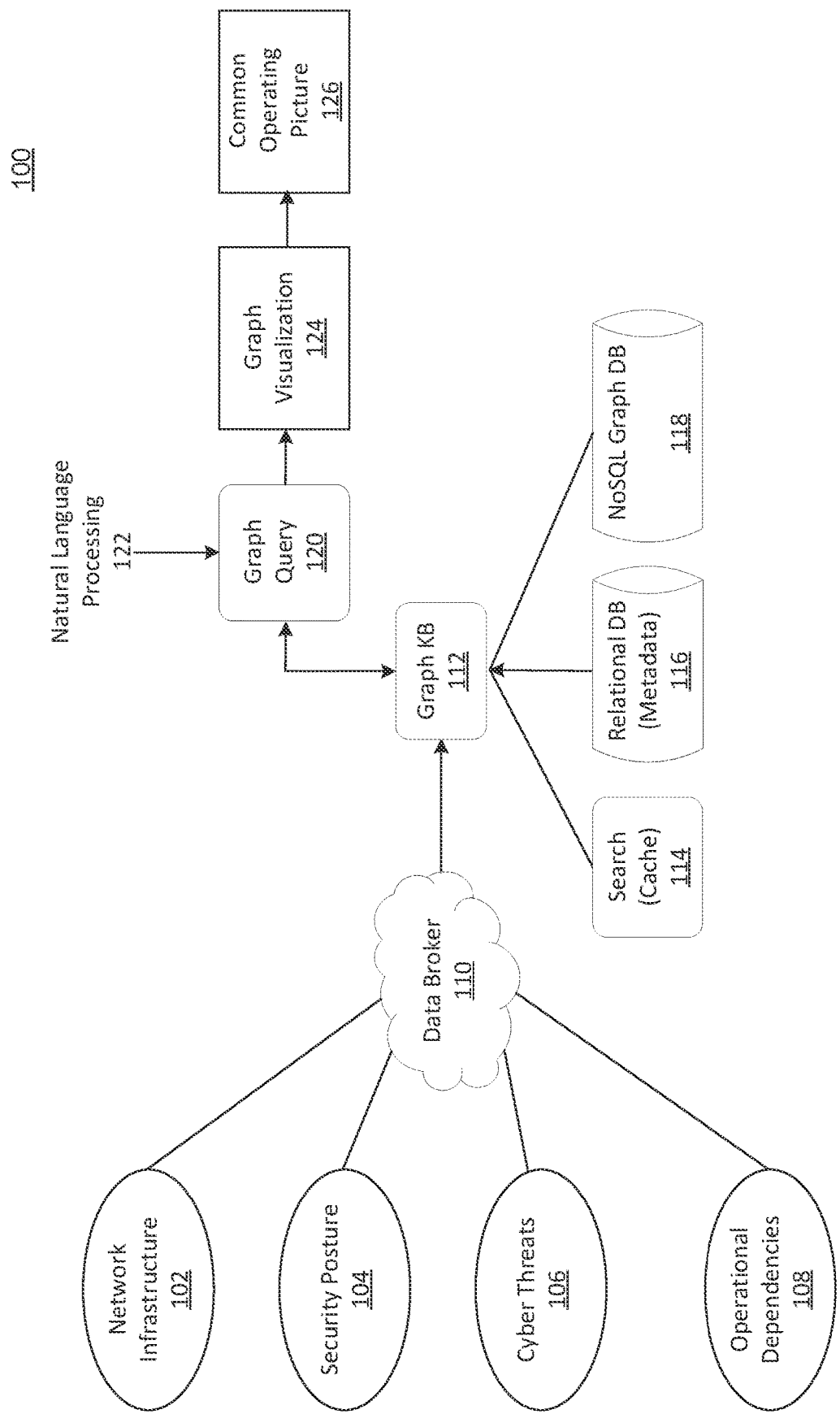
FIG. 1 is a block diagram of an architecture for a graph-based cyber situational understanding system, according to some embodiments.

Provided herein are system, apparatus, device, method and/or computer program product embodiments, and/or combinations and sub-combinations thereof for graph-based cyber-situational visualizations of interconnected cyber-assets.

The technology described herein ingests data from various network systems, and then transforms this data into useful information needed for a decision maker's situational understanding (SU) of a corresponding cyberspace. A graphing tool captures complex interrelationships among cyberspace entities, along with how entities may depend on associated cyber-assets. In some embodiments, the technology described herein provides a graphical overlay to ensure a rapid understanding of how cyberspace activities influence or impact an overall environment or operation.

In some embodiments, a cyberspace may include a network with a plurality of mobile devices interconnected to communicate and share data. However, if a suspected malicious cyber-threat actor enters this network with an intention of stealing or corrupting data (or other actions that would be considered a cyber-threat), an understanding of how this malicious cyber-threat actor affects each of the interconnected devices or the network is needed. The technology described herein generates a situational understanding of this cyberspace. In a non-limiting example, the system may identify who is in the group, how they are connected, who is the malicious actor, who is the malicious actor connected to, what data or information has been transferred, who is asking to enter/leave the group, etc. In some embodiments, the technology described herein in includes a graphing tool to capture and display these complex interrelationships among cyberspace entities, along with how elements of these entities depend on cyber-assets.

In some embodiments, a cyber-overlay graphically illustrates potential cyber-threats and may be arranged to provide an overview of multiple cyber-threats in a complex environment. In some embodiments, the cyber-overlay may illustrate (e.g., graphically) a status of mobile device functions or an operation that includes a plurality of mobile devices, groups of mobile devices, and/or associated platforms impacted by cyberattacks. In some embodiments, the cyber-overlay provides an interactive interface, i.e., clicking to show services that support operational functions or to highlight associated platforms and units on a geospatial view (e.g., digital map). While the descriptions provided herein are focused on mobile computing device environments, non-mobile computing devices or a combination of mobile and non-mobile computing devices may be substituted without departing from the scope of the technology describe herein.

In one exemplary embodiment, the technology described herein ingests data from various tactical network systems, and then transforms this data into useful information needed for a military commander's situational understanding (SU) of cyberspace. This SU provides a cyber-common operational picture (COP) within a command post environment, which may support combat operations. A graphing tool captures complex interrelationships among cyberspace entities, along with how elements of tactical operations depend on cyber-assets. In some embodiments, this technology provides a cyber-overlay on a common geographical area of interest (or operation of interest), enabling rapid understanding of how cyberspace activities influence and impact overall tactical operations.

In one non-limiting example embodiment, a network of delivery vehicles located within a common geographical area (delivery zone), may include one or more computing devices (e.g., smartphones, tables, scanner, laptops, etc.) connected to a communications network within that geographical area. A malicious actor may connect with at least one computing device within this network in an attempt to access data and/or control one or more other computing devices within this network. The operators of the mobile devices may not even be aware of this intrusion, but to mitigate the intrusion, a network supervisor (decision maker) needs a situational understanding of this cyberspace. In a non-limiting example, the system may identify delivery vehicles within this geography, how are they connected, who is the malicious actor, who are they connected to, who are they sharing data with, what data was shared, etc.). In some embodiments, the technology described herein in includes a graphing tool to capture and display complex interrelationships among these mobile devices as overlaid onto a digital map of the delivery area.

While the technology described herein may be described for various interconnected mobile computing devices, it is applicable to any combination of cyber-assets (e.g., mobile computing devices, fixed computing devices, communication infrastructure, etc.) communicating within an established cyber-network in one or more geographies.

In addition, while the various embodiments described herein include mobile device environments, tactical war fighting environments, and vehicle delivery environments, the technology described herein may generate a graphical visualization for any group of network connected computing devices. Non-limiting examples may be computing devices connected through common websites, messaging apps, social media threads, online meetings, ad hoc networks, distributed computer systems, Internet-Of-Things (IOTs) devices, interconnected cameras (e.g., security systems), traffic systems, weather systems or manufacturer or utility installations (chemical processing plants, water supplies, water treatment facilities, dams or nuclear plants, etc.).

FIG. 1 shows an architecture 100 for a graph-based cyber situational awareness system. Data are ingested from various cyber-asset information sources for building a graph-based system addressing potential and actual cyberattacks, defenses, and operational impacts. In this way, the system brings together isolated data and events (e.g., attacks) into an ongoing overall picture for situational awareness and decision support. As will be described in greater detail in FIGS. 2-10C, this data ingest may include, but not be limited to, data about network infrastructure 102, security posture 104, cyber-threats 106, and operational dependencies 108. Data ingested from these data sources may be aggregated by data broker 110 and mapped to nodes (entities) and edges (relationships) in a cyber-graph knowledge base 112.

Network infrastructure 102 may include, but is not limited to, a framework for the specification of a network's physical components and their functional organization and configuration, its operational principles and procedures, as well as communication protocols used. An organization's security posture 104 (or cybersecurity posture) is a collective security status of all software, hardware, services, networks, information, vendors and service providers. Cyber threats 106 include, but are not limited to, possible malicious attempts to damage or disrupt a computer network or system. Operational dependencies 108, may include a value of an asset's specific contribution to the performance of an operation.

In one non-limiting example, mobile devices (entities) may be identified by their Internet Protocol (IP) address. This IP address works like a postal address, allowing data to be routed to the chosen destination. For example, a group of interconnected mobile devices, within a defined geography, may each have cyber-asset data that includes their respective IP address as described in greater detail in association with FIG. 2.

Data broker 110 aggregates information from a variety of sources, processes it to enrich, cleanse or analyze it and provides it to other resources or organizations. In one embodiment, data broker 110 may include a centralized data streaming service using a publish/subscribe model, in which data is shared among multiple data producers and consumers. A data broker cluster instance serves as a centralized integration point within a geographical group, rather than requiring each data producer and consumer to be integrated separately. Its distributed architecture is designed for scalability, fault tolerance, high throughput and high availability.

The particular data sources used for cyber SU, in operational networks (not shown), include firewall logs and network flow records for understanding network traffic patterns, scan reports for understanding host vulnerabilities, analytics for intrusion detection alerting, and Lightweight Directory Access Protocol (LDAP) Data Interchange Format (LDIF) for capturing operational dependencies on cyber-assets. The graph knowledge base 112 supports a variety of use cases, including mapping potential attack paths, assessing vulnerability criticality, correlating intrusion events, and assessing operational risks and impacts of cyberattacks.

Graph knowledge base 112 may be built using various components as will be discussed in greater detail hereafter in FIG. 3. Through its graph-oriented representation, the system supports deep correlation of data to capture complex interdependencies within cyberspace and how operational elements depend on cyber-assets. It employs property graphs, i.e., attributed, multi-relational graphs with nodes and edges having arbitrary properties. This provides the ability to express a range of heterogeneous node and edge types that arise from combining data from various sources, resulting in a unified graph knowledge base.

A search component 114 includes pre-stored (cached) searches of types or classes of data. For example, types/classes may include intelligence, command, control, attack elements, intrusions, malware, operational functions, tactics, services, unit structures, threats, etc. Relational database (DB) 116 stores relationships between data components. For example, relational database 116 collects meta-data, which may include data items with pre-defined relationships between them. For example, metadata may be stored that provides additional information about a mobile device. Metadata is data about data. A simple example of metadata for a mobile device may include a collection of information like a name of the assigned user/owner of the device. In a non-limiting example, the metadata may include security information (e.g., encryption methods/keys), a date the mobile device was put into service or connected to a network, or keywords to describe the mobile device (e.g., "Gary's smartphone").

A Non-Structured Query Logic Graph Database (NoSQL DB) 118 provides data management designed to handle very large sets of structured, semi-structured or unstructured data. These items may be organized as a set of tables with columns and rows. For example, these tables are used to hold unstructured information about objects (e.g., data about a mobile device) represented in the Graph KB. Therefore, it may help store, access, integrate and analyze large data sets (regardless of structure) from various sources.

A user accesses the system with a web browser using natural language processing NLP 122 to create graph queries 120 to interact with the graph-based cyber situational understanding system. Query processing via NLP 122, in one embodiment, may be packaged as a web service. NLP 122 converts natural language questions posed by users into cypher queries, which are then sent to a graph database service. This may significantly reduce the level of specialized technical knowledge needed for expressing ad hoc queries to extract actionable information from the system.

The system 100 supports a range of modalities for expressing analytic queries. This includes a form for selecting attributes for basic query patterns, a code editor for specifying potentially more complex queries in native graph query language, a library of stored queries, and questions expressed in natural language that are converted to a formal query language. The system then displays query results (matches to graph queries) in interactive node-link visualizations for rapid understanding of complex relationships (e.g., FIG. 2B).

In some embodiments, the system benefits cyber-analysts (decision makers) to provide a view into a cyberspace environment, execute queries directed to that landscape, and derive insights from looking at query results. In an exemplary embodiment, a graph-based cyber-situational understanding app (e.g., plugin), is intended for commanders and staff to provide a dashboard view of cyberspace interrelationships overlaid onto a geographic view (graph visualization 124) to inform military operations. The graph-based cyber situational understanding plugin interacts with the system and executes queries automatically to populate a commander/staff view of a common operating picture shown by COP 126. For example, COP 126 includes an image of a mission area (e.g., from a satellite) with icons representing geographical locations of potential cyber threats (See FIG. 7).

In the various embodiments described herein, the graph knowledge base 112, graph queries 120 driving data analytics, and interactive graph visualizations 124 are focused on the cyber-domain. However, the technology described herein may be focused on any operational objective, such as, but not limited to, location tracking of computing devices within a selected geographical area.

Figure 2A:
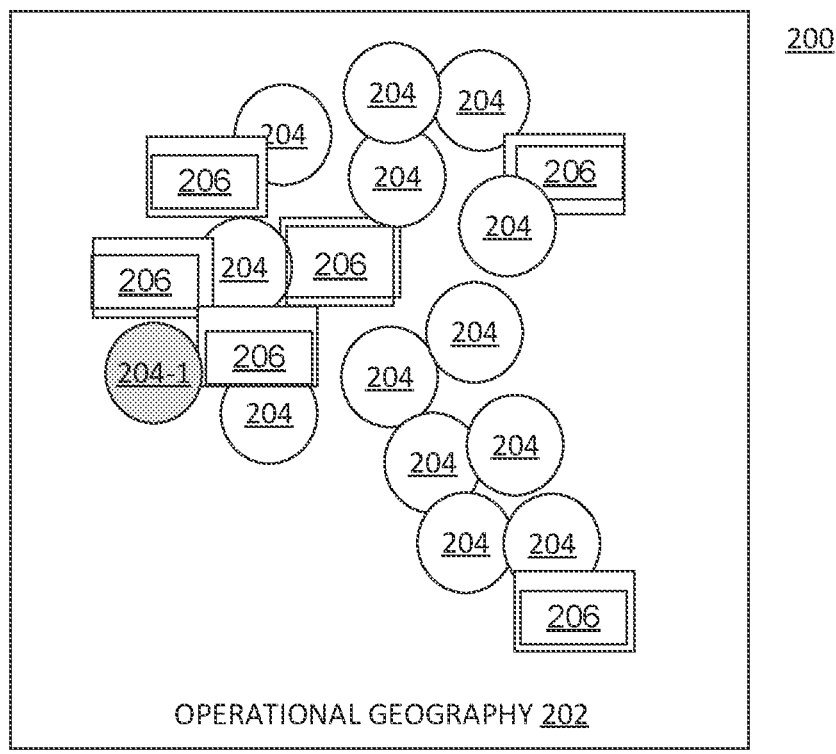
FIG. 2A is an example cyber-situational overlay, according to some embodiments.

FIG. 2A illustrates a high-level graphical visualization 200 over an operational environment, according to some embodiments. In one non-limited example, operational geography 202 represents a geography where cyber-assets are located. As shown, one or more groups of mobile devices 204 as well as cyber-platforms 206 (routers, server systems, communications infrastructure, etc.) are illustrated within operational geography 202. Continuing with the earlier delivery vehicle example, each circle labeled 204 may represent a group of mobile devices operating in a specific geographical location (e.g., delivery zone) relative to operational geography 202. For example, operational geography 202 may represent a county where a vendor makes deliveries and mobile devices 204 may represent a plurality of vendor vehicle devices included in a specific delivery zone within the county. As will be described in greater detail in association with FIG. 7, queries into various cyber-activities may be generated for any cyber-asset or operational objective. In a non-limiting example, queries may be directed to a specific location, one delivery zone, a plurality of delivery zones, an entire operational geography 202, specific IP addresses, specific communication mediums or standards (e.g., cellular, microwave, satellite, WiFi, etc.). For example, a supervisor may generate a query to the system, "show me all delivery zones with a current cyberattack".

The system may return a highlighted delivery zone 204-1 reflecting a delivery zone currently under attack. The supervisor may then drill down, or pass to another operator, this area of concern. For example, a supervisor selects delivery zone 204-1 and receives a cyber-graph 208 of interconnected mobile devices located within this zone and identified by their IP addresses as shown in FIG. 2B.

Figure 2B:
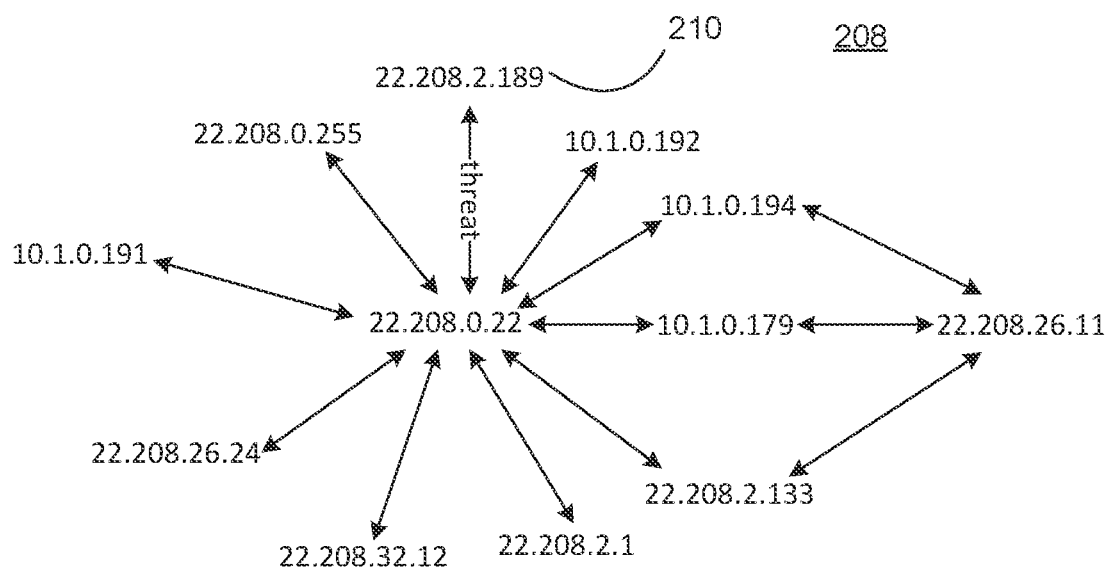
FIG. 2B is an example cyber-graph, according to some embodiments.

FIG. 2B illustrates cyber-graph 208 of traffic communications for two particular IP addresses (22.208.x.xxx and 10.1.0.xxx). Each IP address represents one mobile device in the group of mobile devices within delivery zone 204-1. In the cyber-graph visualization detail drilldown (showing selected node properties), a suspicious service on IP address 22.208.2.189 (210) has been detected from the ten IP addresses communicating with 22.208.0.22. Identifying this intrusion threat and further identifying potentially comprised connected devices (IP addresses) provides a supervisor with much needed information to begin mitigation steps. The graphical nature of the data provides benefits of a quicker analysis in an easy to understand format.

Figure 3:
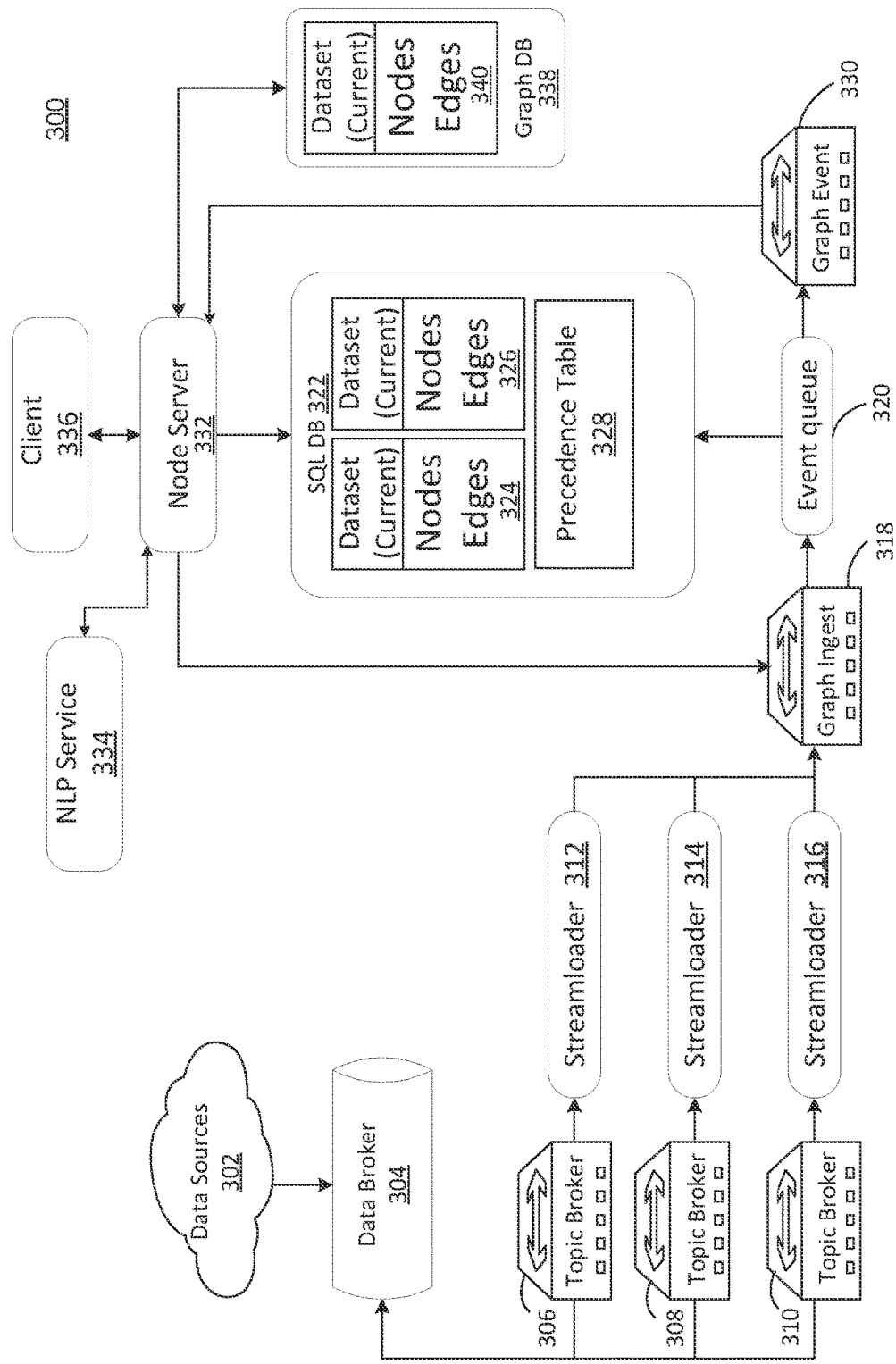
FIG. 3 is a block diagram of a device for creating cyber-graphs, according to some embodiments.

FIG. 3 is a flowchart for a system 300 for creating cyber-graphs, according to some embodiments. System 300 may be implemented by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the elements may be performed simultaneously, or in a different order than shown in FIG. 3, as will be understood by a person of ordinary skill in the art.

In the simplified cyber-graph example of FIG. 2B, IP address 22.208.0.22 represents a node, while the ten connecting IP addresses represent edges in the graph 208. However, any cyber-asset may be determined to be a node when connected by a plurality of edges. In addition, multiple nodes may be aggregated to illustrate a higher-level node (multiple cyber-assets, cyber-asset classes (e.g., mobile devices or platforms) or geography). Likewise, a higher-level node may be broken down into smaller nodes.

System 300, in one embodiment, includes a SQL DB 322 and a graph database 338. SQL database 322 may store multiple datasets 324 and 326 (nodes and edges) shared among users of the system, with each dataset being independent (e.g., for different use cases, operational domains, queries, etc.). A dataset 340 that is loaded from SQL database 322 into graph database 338 becomes the shared knowledge base for analytic queries by all users. For example, cyber-asset knowledge obtained about one or more mobile devices as described in the operational geography of FIGS. 2A and 2B, may be stored in SQL DB 322. Based on a received graph query, cyber-asset knowledge of any requested group of mobile devices may be loaded into graph DB 338 for generating a cyber-graph. Continuing with the delivery vehicle example, any supervisor from any of the delivery areas may generate a query to determine potential cyberattacks within their respective delivery areas. Alternately, or in addition to, a second, but different graph query may be made on the same mobile devices. For example, a second supervisor query on a same group of mobile devices may be "show me all mobile devices not currently responding to network communications".

System 300 supports streaming data ingest from external data sources 302 (sources 102, 104, 106 and 108 from FIG. 1) through data broker 304 (data broker 110 in FIG. 1) in a standardized data ingest format. This format supports rapid integration of new data (topics) via format-specific stream loaders 312, 314, 316, etc. These stream loaders are responsible for converting received data of different topics (e.g., device identifications, device statuses, device connections, location data, network flows, intrusion alerts, device threat information, etc.) into a standard cyber-graph data ingest 318 format, which may identify nodes/edges 324 and 326, relationships, and properties that are specific to the particular data source. In one embodiment, stream loaders 312, 314, and 316 are stream loader services for various network flows and topics.

An event queue service 320 takes data from the cyber-graph ingest 318 (originating from topic brokers 306, 308, 310, etc.) and merges it into the graph knowledge base (SQL DB 322). The merging process adds, updates, or deletes data sets, such as, 324 and 326 (nodes and edges) as necessary to keep incoming data semantically consistent with existing data. The event queue service allows for the aggregation of data properties to enrich the dataset with information such as the total count of nodes of a certain type. Event queue service 320 updates the existing dataset (e.g., 324) in the SQL database 322 then publishes the event to the graph-event 330 topic. The graph-event 330 topic is monitored by node server 332 which subsequently updates the data in graph DB 338 if that dataset is currently active. During a merging process, it is necessary to determine the "type" field for a node or edge as the existing type and the incoming type may differ.

When the incoming and existing type differs, a configurable precedence table 328 is utilized to determine the merged type. The table is a list of possible node and edge types paired with a numerical value. When an incoming node or edge has a different type than the existing entity, the system looks in the precedence table and sets the merged type to the precedence with the highest numerical value. If only one of the types being compared is in the table, that value is used. If neither type being compared is in the precedence table 328, the incoming type is used. The precedence table is configurable by a system administrator in order to support different data analysis priorities.

In support of such ad hoc analytic graph queries, cyber-graph system 300 integrates with a natural language processing (NLP) service 334 that converts questions posed in English through, for example, a chat interface into formal graph query language. This helps ease requirements for specialized knowledge in cyber-graph query formulation. It also aligns with the ubiquitous application of chat technology in tactical operations, e.g., to share common knowledge across units and situations.

The graph-event 330 topic provides a location for external services to watch for changes to the data in order to trigger their own processes. The event is then forwarded to connected web clients 336, e.g., interfaces for updating COP dashboards.

When an "active" graph base 338 is updated (by user actions or through the streaming data ingest pipeline 302-318), corresponding updates may be made in an "archive" version in the SQL DB 322. An active graph base 338 includes one or more graphs of nodes and edges instantiated by a current graph query based on one or more of the NoSQL graph data collected from the cyber-assets. This graph may be updated by additional queries of the same or a subset of the data or updated as conditions of the cyber-assets change. In a non-limiting example, as new data from each of the IP addresses is uploaded to the system, the graph base may change. In another non-limiting graph updating example, any mobile device in FIG. 2B may disconnect from the network and no longer be vulnerable to attack from mobile device threat 210.

Figure 4:
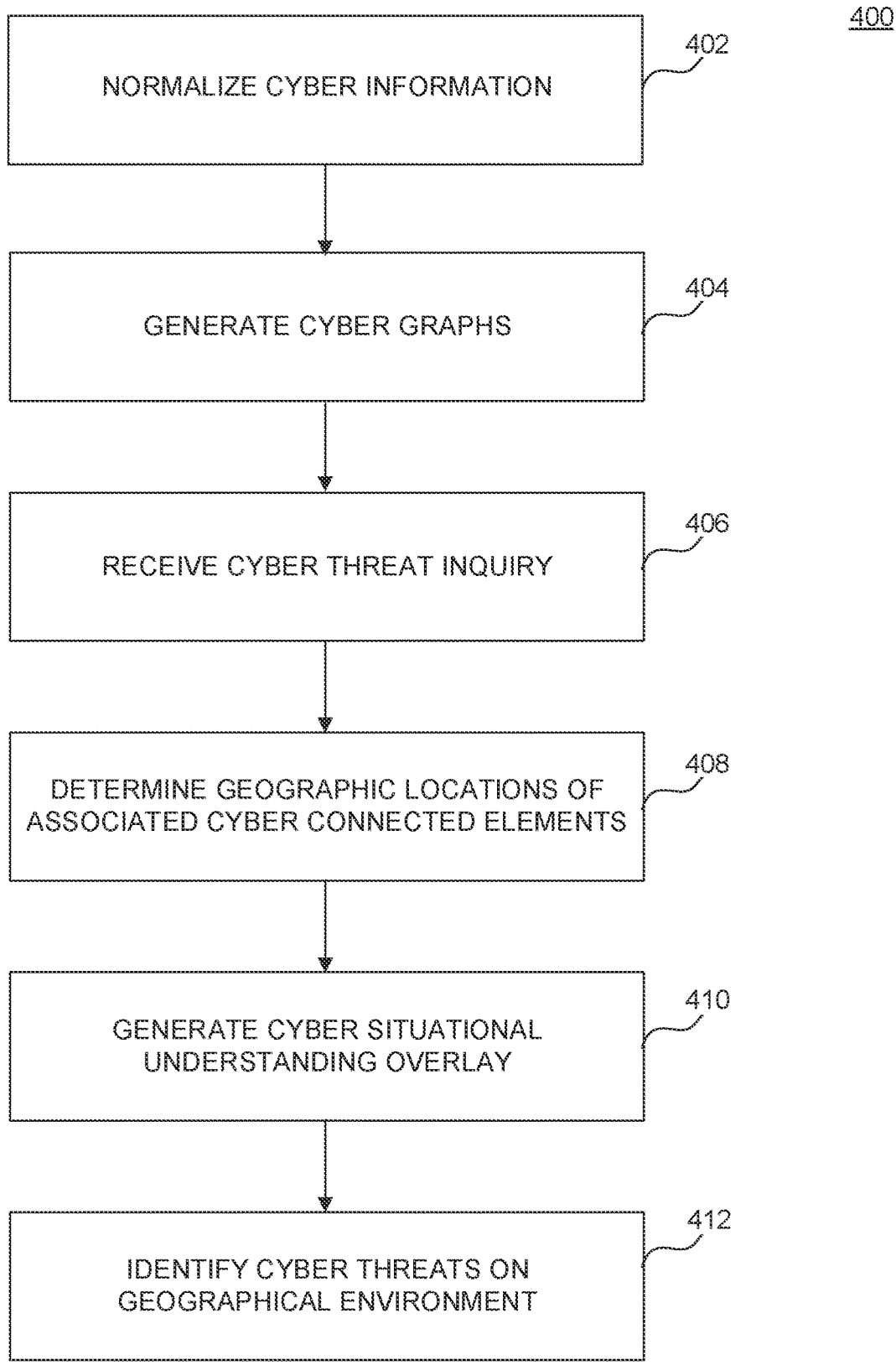
FIG. 4 is a flowchart for a method providing cyber SU using cyber-graphs as an overlay in operational environments, according to some embodiments.

FIG. 4 is a flowchart for a method providing cyber SU overlays with cyber-graphs in operational environments, according to some embodiments. The method can be performed by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the elements may be performed simultaneously, or in a different order than shown in FIG. 4, as will be understood by a person of ordinary skill in the art.

In element 402, cyber-data is captured and normalized (common structure). For example, as previously discussed in association with FIG. 3, data sources (topics) provide data ingested using a common streaming format. In this phase of processing, data from a particular source (intrusion alerts, network flow records, etc.) may be parsed and mapped to a common (normalized) model. At this stage of processing, the events have been mapped to a common set of field names. But they are still represented as isolated sets of events.

In 404, the normalized events from 402 are processed to generate elements of a cyber-graph. For example, for a particular network flow record (event), the system creates a node for the flow source IP address, a node for the flow destination IP address, and an edge directed from the source IP address to the destination IP address. Each node and edge then has various properties (name/value pairs) defined for them.

For the 404 process, the system may support two modes of ingest: bulk load and incremental. For bulk ingest, 404 may create a unique set of nodes (with a unique identifier property) across the entire ingested graph. For incremental ingest, 404 may include an ability to examine previously ingested nodes and edges, and to merge incoming ones into existing ones as needed (based on the identifier property). In addition, 404 may include additional rules that specify exactly how the merging (aggregation) is done. For example, for network flow records, there is a property on edges that indicates the number of flows that have been observed for a given source/destination IP address pair. Then 404 includes an aggregation rule that the flow-count property for that edge (source/destination pair) for an incoming flow record event is to be added to the flow-count property already stored in the graph database, i.e., incrementing the stored value per the new event.

For example, cyber data are represented by internet addresses (e.g., 22.208.0.22) that uniquely identify that source as a node (entity). A data source may include, but is not limited to, a computer installed on a moving vehicle, a portable or fixed camera, sensors (e.g., internet of things (IOT)) deployed in the field, an airborne device (e.g., airplane, drone, satellite, etc.), water-based vehicle (e.g., submarine, etc.) or specific personnel applications (identifier, location, capabilities, specific operation, etc.).

Next, 406 represents the system receiving a user generated query about a particular kind of impact or risk with respect to one or more cyber events (e.g., alerts or known vulnerabilities). As previously discussed, natural language queries received from a user of the system (e.g., supervisor) are translated into graph queries to search the active data set (active knowledge database) for matching or similar graphs.

In 408, geographic locations of associated cyber-asset elements are determined. As described above, platforms may be a category of an operational element that has latitude/longitude provided by external systems that track platform locations. Then particular platforms are assigned to units (or groups). Therefore, the geographic location of a unit is derived from the locations of its platforms. Typically, the geographic position of a unit is the spatial average of the locations of its platforms. Then, units are subordinate to other units (higher operational echelons). In that case, the location for a unit is derived from the locations of its subordinate units (typically, the spatial average of the subordinate units).

In 410, the information from 408 (which includes risk/impact categories for each operation element along with geographic locations) is used to generate (render) the cyber situational understanding overlay. This graphical overlay provides a geographic view (graph visualization 124) of operational threads/services to inform operations. For example, cyber-threats matching the inquiry are then filtered for a specific geographic area (e.g., operation location) by identifying location specific information (e.g., GPS data) associated with the data sources.

In element 412, specific cyber threats are identified as specific graphic icons using type or class identifiers such as, but not limited to, intelligence, command, control, attack elements, intrusions, malware, operational functions, tactics, services, unit structures, threats, etc.

Figure 5:
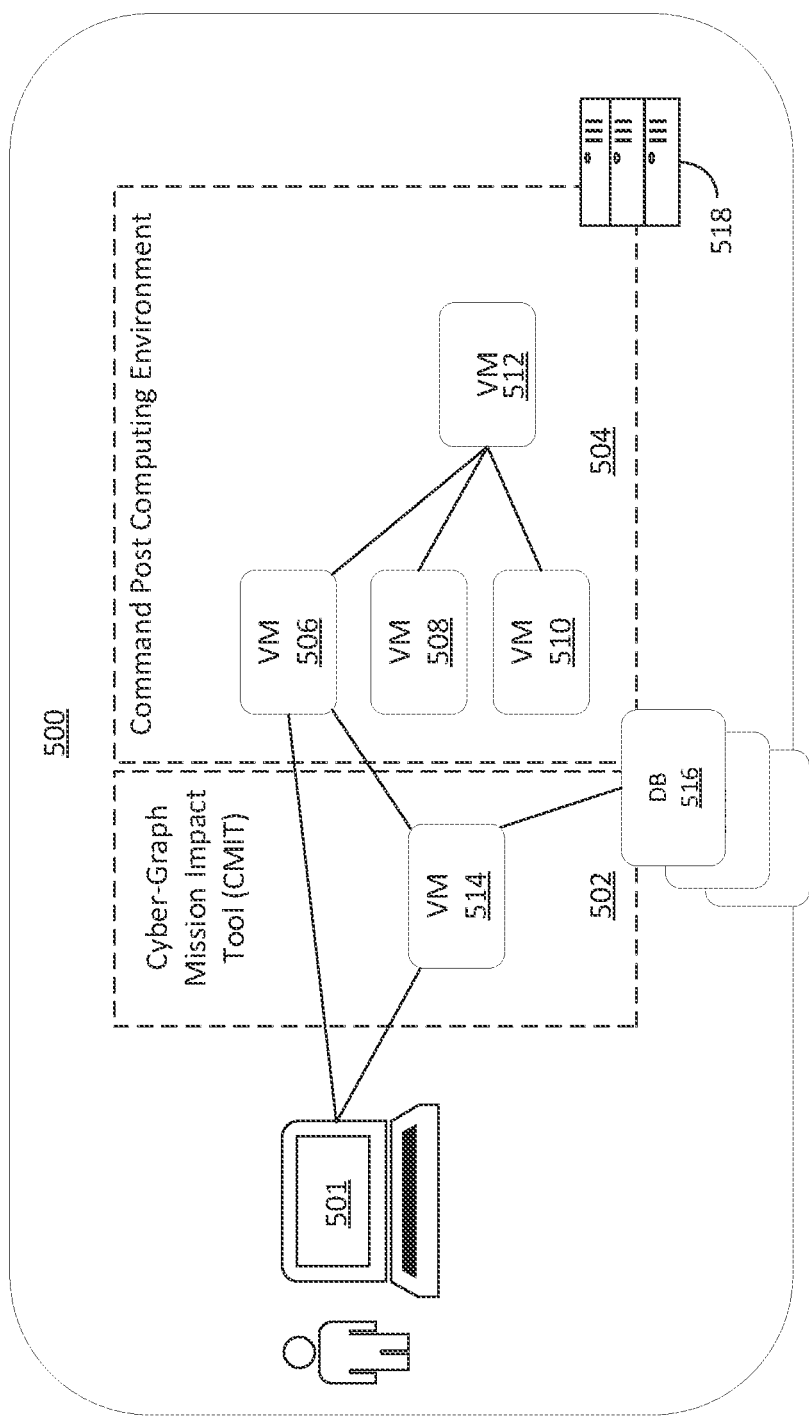
FIG. 5 is a block diagram of a graph-based cyber situational understanding system integrating cyber-graphs into the Common Operating Picture (COP) as overlays, according to some embodiments.

FIG. 5 illustrates a system 500 to integrate cyber-graphs into a Common Operating Picture (COP) 126 as overlays, according to some embodiments. The system can be performed by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the elements may be performed simultaneously, or in a different order than shown in FIG. 5, as will be understood by a person of ordinary skill in the art.

The cyber-overlay provides decision makers a rapid understanding of operational risks and impacts from cyber activities. The cyber-graph user interface itself allows for more detailed analytics, e.g., by supporting staff. In one embodiment, these dashboards are may be accessed via web browser.

A cyber-support application (app) is supported by server-side 504 and client-side 502 components. The server-side 504 and client-side components 502 reside in one or more Virtual Machines (VMs) supported by one or more servers 518. A virtual machine is a computer file that behaves like an actual computer. It can run in a computer window as a separate computing environment, for example, to run a different operating system. In an exemplary embodiment, these VMs may include one or more of, Web 506 (interface to the Web), Geo (location) 508, Persistence 510 (ranked event importance), and Active Directory 512 (hierarchy of which computers belong on which network). Client-side 502 may support a VM 514 that may use a mission dependent impact app to discover mission dependent impacts through user queries 501. The VMs may support a variety of software plugins, such as cyber-support, interfaces, Web publisher, client apps, mission dependent impact apps, Windows® service, or reverse proxy configuration to support queries to VM 514.

A user 501 accesses cyber support with a web browser to interact with cyber-graph and support apps. VM 514 graphs data (stored in DB 516), as previously described in association with FIGS. 1-3, and may be intended for a cyber-analyst to have a view into the cyber-environment, execute queries on that environment, and derive insights from looking at query results. The client-side mission dependent impact app run by VM 514 is intended to provide a dashboard view of war fighting functions and underlying mission threads and a geographic view of these threads to commanders and staff to inform operations. The cyber support app interacts with VM 514 to executes queries automatically to populate a commander/staffs' view.

Figure 6:
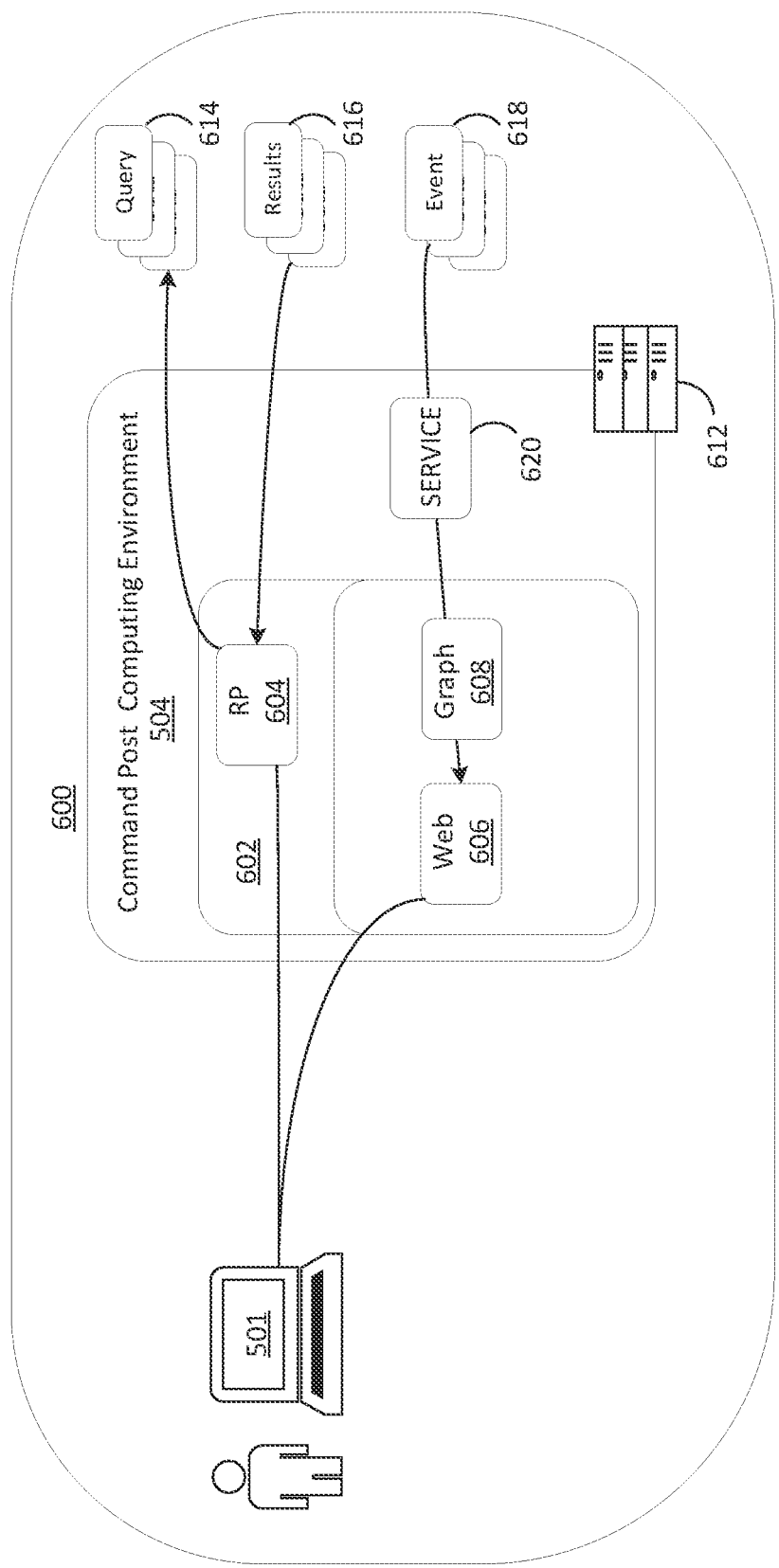
FIG. 6 is a block diagram of a device for creating cyber-graphs, according to some embodiments.

FIG. 6 is a system 600 for creating cyber-graphs in a command post computing environment 504, according to some embodiments. System 600 can be performed by processing logic that can comprise hardware 612 (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the descriptions may be performed simultaneously, or in a different order than shown in FIG. 6, as will be understood by a person of ordinary skill in the art.

Server-side flow of data through the system is as follows: data in an underlying cyber-environment changes based on an event 618 that is identified, for example, by the mission impact tool 502 of FIG. 5. Event 618 is received by the Windows service 620, which forwards an HTTP request to cyber-graph interface 608 (graph) that subsequently shares the event with cyber-support Web publisher 606 (Web). User 501 generates a query (or selects a previously formatted query 614) to Web publisher 606 that is related to the event (e.g., cyberattack). The cyber-graph system (e.g., graph DB 338) receives A client app receives the event and queries CMIT through reverse proxy 604 (i.e., directs client requests to the appropriate backend server). The results 616 of the CMIT query are sent to the client app. Both the query (stored in DB 614) as well as the query results 616 may be subsequently sent to the mission impact tool 502 to be displayed to the user for further analysis.

Figure 7:
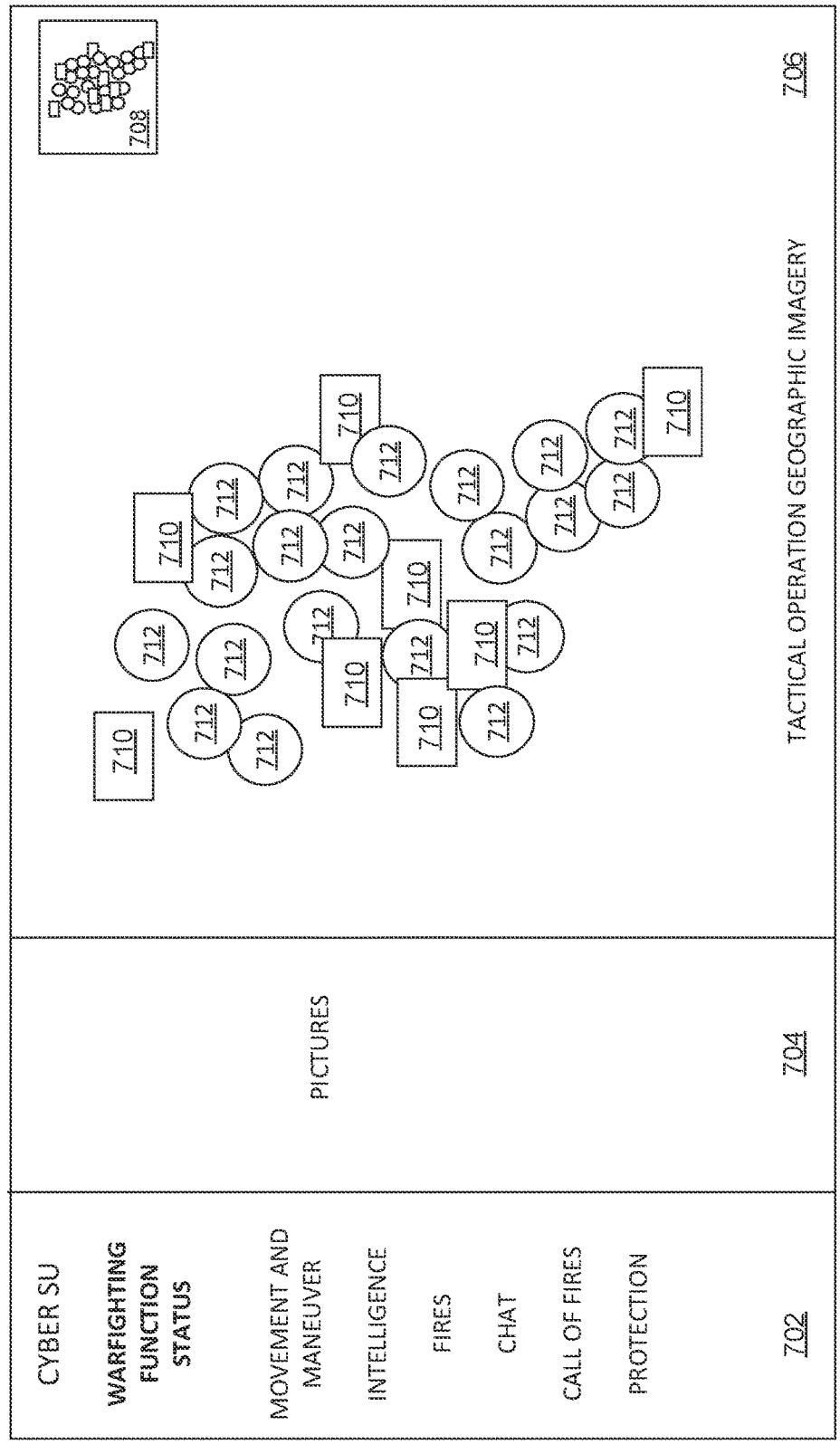
FIG. 7 illustrates a GUI with cyber-graph overlays on an operational environment, according to some embodiments.

FIG. 7 illustrates a GUI with cyber overlay on a tactical environment, according to some embodiments. In an exemplary embodiment, Cyber SU overlay(s) provide picture-based visualizations showing the "so what" factor of cyber threats, oriented to military commanders. The cyber overlay shows the status of common warfighting functions 702 (e.g., Movement and Maneuver, Intelligence, Fires, Chat (bidirectional flow of communications), Call on Fires, and Protection) across specific units and platforms impacted by cyber-attacks, as determined by cyber-graph queries.

The movement and maneuver warfighting function relates to tasks and systems that move and employ forces to achieve a position of relative advantage over the enemy and other threats. The intelligence warfighting function relates to tasks and systems that facilitate understanding the enemy, terrain, and civil considerations. The fires warfighting function relates to tasks and systems that provide collective and coordinated use of indirect fires, such as air attacks or missile launches. The call on fires reflects orders to use fires to suppress, neutralize, or destroy in order to accomplish the targeting objective. The protection warfighting function relates to tasks and systems that preserve the forces so the commander can apply maximum combat power to accomplish the mission.

The GUI may be interactive, i.e., clicking to show services that support warfighting functions or to highlight associated platforms (710) and units (712) on the COP geospatial view 706 (tactical operation geographic imagery). In particular, the various shapes (squares, circles, etc.) and other graphic properties (e.g., color, highlighting, etc.) may be assigned particular meanings for military operations (e.g., as defined per MIL-STD-2525C symbology). COP geospatial view 706, in one embodiment, includes a terrain mapping selected from satellite imagery (pictures 704). This imagery reflects immediate mission geographies of interest by a commander or user of the cyber-graph overlay SU system with overlays reflective of the query.

In 702, there may be four top-level entities: Movement and Maneuver, Intelligence, Fires, and Protection. These are warfighting functions, which are functional capabilities that may be needed for various missions. Then in 702, there are two services that support the Fires warfighting function: Chat and Call for Fires. Services are applications available on a network that facilitate particular operational capabilities.

Next, 704 represents user-selectable layers of elements that appear as the cyber SU overlay on the geographic map (706). For example, a checkbox (not shown) may be selected for interoperability of host platforms. Interoperability is a service, which is impacted by a cyberattack. Then the checkbox selects those platforms (which are impacted) that host interoperability services. With the checkbox selected, those platforms are highlighted in the map. In particular, platforms have geographic locations (latitudes/longitudes): they may therefore be placed on the map. The pictures component (704) allows for the selection of services such that their platforms are highlighted on a selected digital map with a cyber SU overlay component. Graphic 708 provides an indication where the selected geography is located on an overall larger geography.

Figure 8:
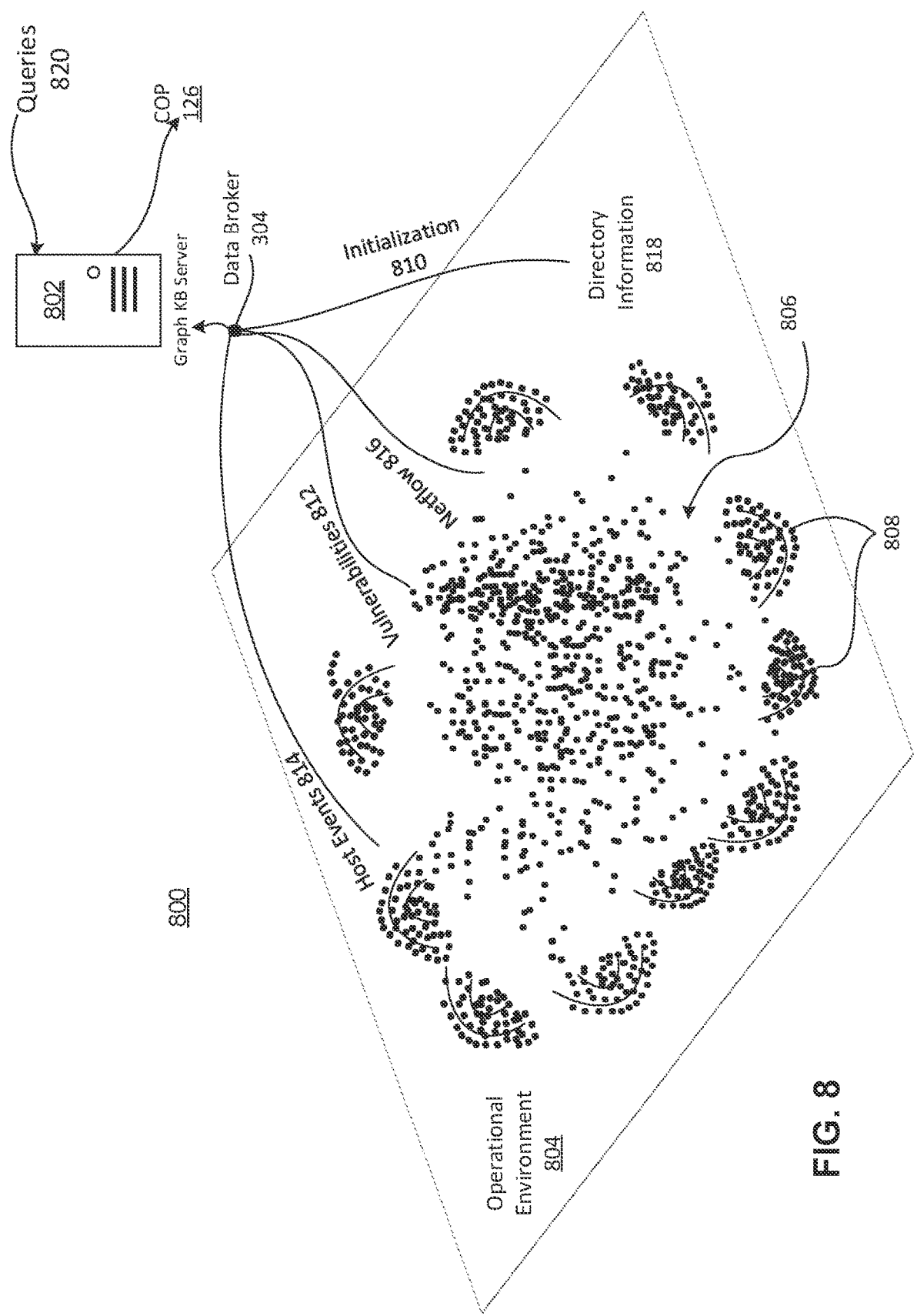
FIG. 8 illustrates cyber support for a tactical network deployment, according to some embodiments.

FIG. 8 shows the relationships among the various components of cyber support within the context of a tactical network deployment 800. While described for a war fighting operational environment 804, the sourcing of cyber-asset information deployed within a geographical area may be applied to any military or non-military environment where computing assets are interconnected in a network environment.

Cyber-asset deployments (illustrated as a plurality of dots located within a geographic operational environment 804) are interconnected by one or more networks. To understand the cyberspace the system collects information about these cyber-assets and their associated relationships to other cyber-assets and network infrastructure. In some embodiments, a cyber-graph knowledge base server 802 (Graph KB 112 in FIG. 1) is initialized 810 from LDIF (directory information 818 that captures network operational dependencies for cyber-assets) and other network initialization and configuration data, forming a property graph model of elements within the operational environment 804, e.g., a brigade combat team 806 and its subordinate units 808, warfighting platforms and other assets within each unit, critical network services, and warfighting functions supported by those services.

Vulnerability reports are generated from discovered vulnerabilities 812 and are associated with cyber-data sourcing hosts in the cyber-graph system. Host operating system events 814 (e.g., cyberattacks) are collected as previously described in FIG. 3 through data broker 304 and streamed for data tagging and cyber-intrusion alerting. Cyber-intrusion alerts are streamed (Data Broker) to the cyber-graph system and merged into its graph knowledge base 112. Network flow records 816 from firewall logs are also streamed (Data Broker) into cyber-graph, which captures inter-host traffic patterns across the network.

In this way, the cyber-graph DB serves as a continuously updated knowledge base supporting an overall cyber-analysis and visualization (e.g., COP 126). One or more queries can be defined to provide multi-step (graph) correlated data to populate a commander/staff view of a common operating picture as shown by COP 126. The cyber-data may be continually refreshed as platforms, units, services, and warfighting functions are impacted by detected cyberattacks, as determined through correlation between compromised cyber-assets and the mission elements that depend on them. Correlations may be examined in more detail through ad hoc queries 820 that match graph traversal patterns specified by a requestor.

In support of such ad hoc analytic queries 820, the cyber-graph system integrates with an NLP service that converts questions posed in English through a chat interface into formal graph query language. This helps ease requirements for specialized knowledge in cyber-graph query formulation. It also aligns with the ubiquitous application of chat technology in tactical operations, e.g., for shared common knowledge across units and situations.

The NLP service integrated with cyber-graph may include machine-learning algorithms that are trained with representative examples of natural language questions and corresponding formal queries. Each record has a question posed in natural language (English) and the corresponding cypher query (native query language for the graph database) that answers the question. Such training sets are compiled from examples built manually by subject-matter experts. These baseline examples are then expanded through automated enumeration against base patterns for more comprehensive training coverage.

In training data. English words or phrases refer to elements of a cyber-graph domain model (inferred through data ingest). Such data elements include primary types for nodes or edges, either singularly or in Boolean combinations. Other phrases refer to values to be matched for particular node or edge properties. There are also phrases that refer to multi-step paths to be matched, e.g., of a certain depth.

The NLP service carries out a multi-phase process that includes recognizing the particular category of intended information (intent class) conveyed for a given English phrase, tagging parts of a phrase in terms of cyber-graph domain model elements, resolving any synonymous words or phrases, and formulating a cypher query as an instance of a recognized intent class. In one example, input English phrases include tags denoting a particular edge type. In one example, class definitions return cypher queries populated from tagged input instances. In addition, synonymous words or phrases are mapped to node types in a cyber-graph domain model.

Figure 9:
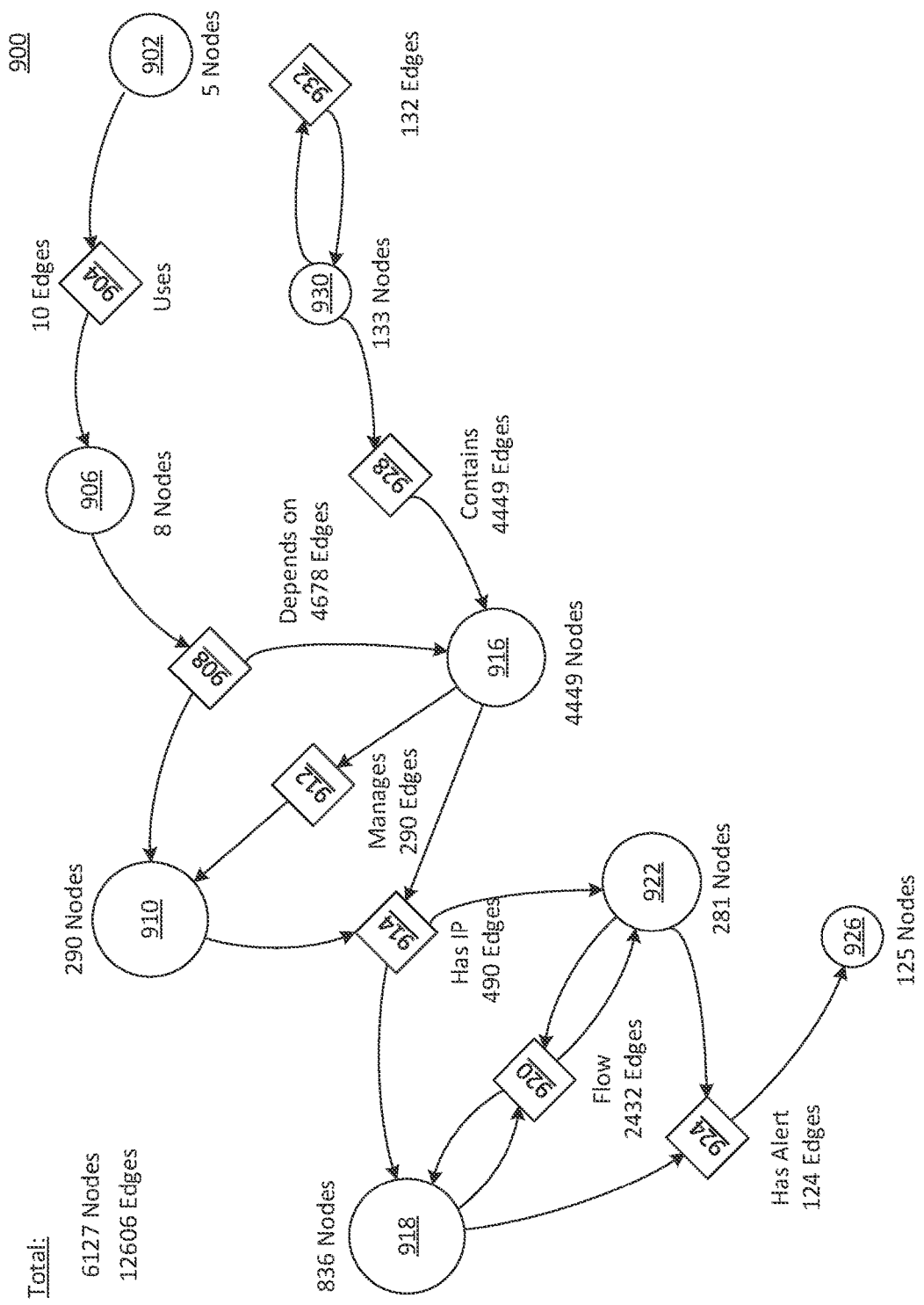
FIG. 9 illustrates a cyber-graph node-edge mapping for a given populated graph knowledge base, according to some embodiments.

FIG. 9 illustrates a cyber-graph 900 for a given populated graph knowledge base. The cyber-graph captures node types, edge types and how they are connected. The cyber-graph then renders the cyber-graph in an interactive visualization. For illustration, this cyber-graph user interface screenshot is annotated with a total of 6127 nodes and 12606 edges.

High-level nodes 902, 906, 910, 916, 918, 922, 926, and 930 may represent specific system elements (i.e., a collection of nodes to represent a specific system). For example, node 902 may be a War Fighting Function (WFF), 906 may be services (Army, Navy, etc.), 910 can be VMs (virtual machines), 916 can be network platforms, 918 can be Non-LDIF (e.g., not operation dependent entities), 922 can be IP Addresses, and 926 can be Alerts. Edges 904, 908, 912, 914, 920, 924, 928, and 932 represent relationships between nodes and are illustrated as a total number of edges between two nodes.

In one example embodiment, the cyber-graph knowledge base is populated from various data sources. The cyber-graphs capture the relationships of, for example, tactical units based on the structure of tactical organizations at all echelons from divisions to platoons. In addition to the automated initialization of units into cyber-graph, dependencies on warfighting function are also added based on battlefield functional areas and role names.

The initialized knowledge base also defines positional attributes (locations) associated with platforms. It may also define a hierarchical (subordinate/superordinate) structure of tactical units within the scope of the cyber support validation of cyber SU capabilities.

By way of non-limiting examples, the nodes may be configured to represent any of, functions critical to organization mission operations that are further linked to nodes representing network services used by the functions, network services that link to nodes representing virtual machines that are depended on by the network services, network services that link to nodes representing deployment platforms that are depended on by those network services, organizational units that link to nodes representing subordinate organizational units, organizational units that link to nodes representing deployment platforms that are contained by the organizational units, deployment platforms that link to nodes representing virtual machines that are managed by the deployment platforms, virtual machines that link to nodes representing unmanaged IP addresses assigned to the virtual machines, virtual machines that link to nodes representing managed IP addresses assigned to the virtual machines, deployment platforms that link to nodes representing unmanaged IP addresses assigned to the deployment platforms, deployment platforms that link to nodes representing managed IP addresses assigned to the deployment platforms, unmanaged IP addresses that link to nodes representing unmanaged IP addresses that receive network flows from the unmanaged IP addresses, unmanaged IP addresses that link to nodes representing managed IP addresses that receive network flows from the unmanaged IP addresses, managed IP addresses that link to nodes representing unmanaged IP addresses that receive network flows from the managed IP addresses, managed IP addresses that link to nodes representing managed IP addresses that receive network flows from the managed IP addresses, unmanaged IP addresses that link to nodes representing cyberattack alerts that are associated with the unmanaged IP addresses or managed IP addresses that link to nodes representing cyberattack alerts that are associated with the managed IP addresses.

Figure 10A:
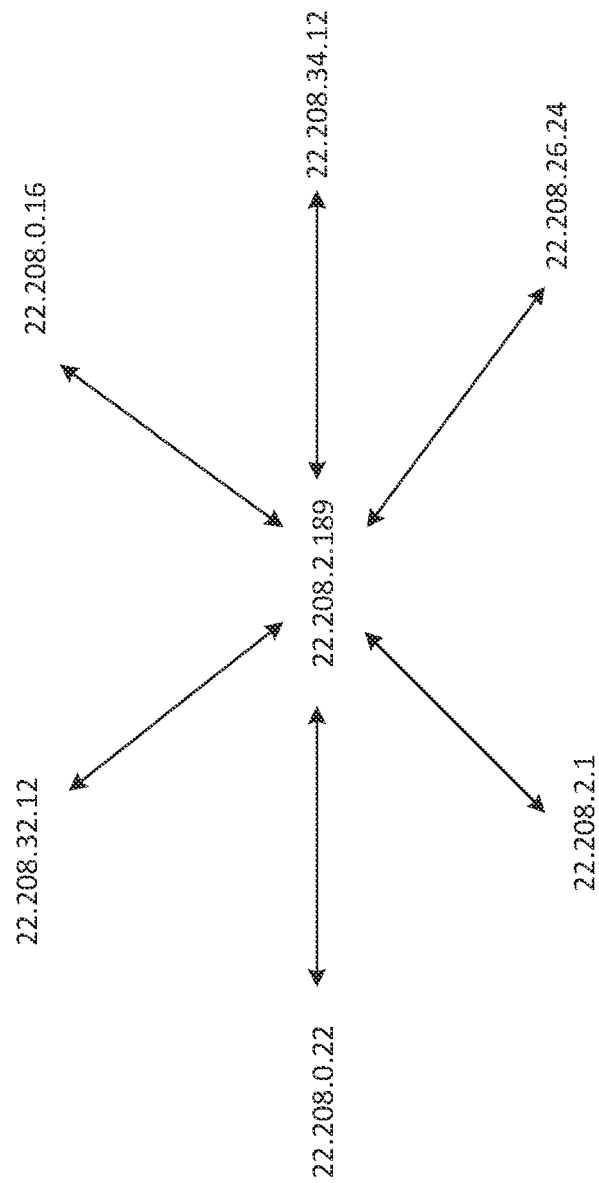
FIGS. 10A, 10B, and 10C, collectively illustrate an example cyber-graph embodiment.

FIG. 10A illustrates a query result illustrating traffic communications 1000 for two user-selected IP addresses (22.208.0.22 and 22.208.26.11). Continuing from the example illustrated in FIG. 2B, IP addresses (for virtual machines) in the environment are hub centers, with edges that may point to intrusion alerts generated for each IP address. Even for such a direct (single step) correlation, certain patterns are immediately discernable, such as how alerts of different kinds and in differing numbers may be distributed across IP addresses. There are two types of IP addresses, i.e., those that are identified in the LDIF initialization and those that are not (e.g., a malicious actor may connect to an already established network and therefore would not be identified during network initialization).

Non-LDIF identified IP addresses are singled out for the purpose of comparison, because of, for example, considerable differences may exist in their alert profiles. In the FIG. 2B cyber-graph visualization detail drilldown (showing selected node properties), a suspicious service on (non-LDIF) IP addresses 22.208.2.189 (210) has been detected from the ten IP addresses communicating with 22.208.0.22. However, a decision maker reviewing this data may also want to understand what cyber-assets may also be connected to suspicious IP address 22.208.2.189. By querying the system, for example. "what IP addresses are also connected to 22.208.2.189?", a resulting cyber-graph 1000 is generated and displayed. As shown, five additional IP addresses of additional interconnected cyber-assets, not revealed in the original query, have been identified. Only IP address 22.208.0.22 was originally identified as shown in FIG. 2B cyber-graph.

Figure 10B:
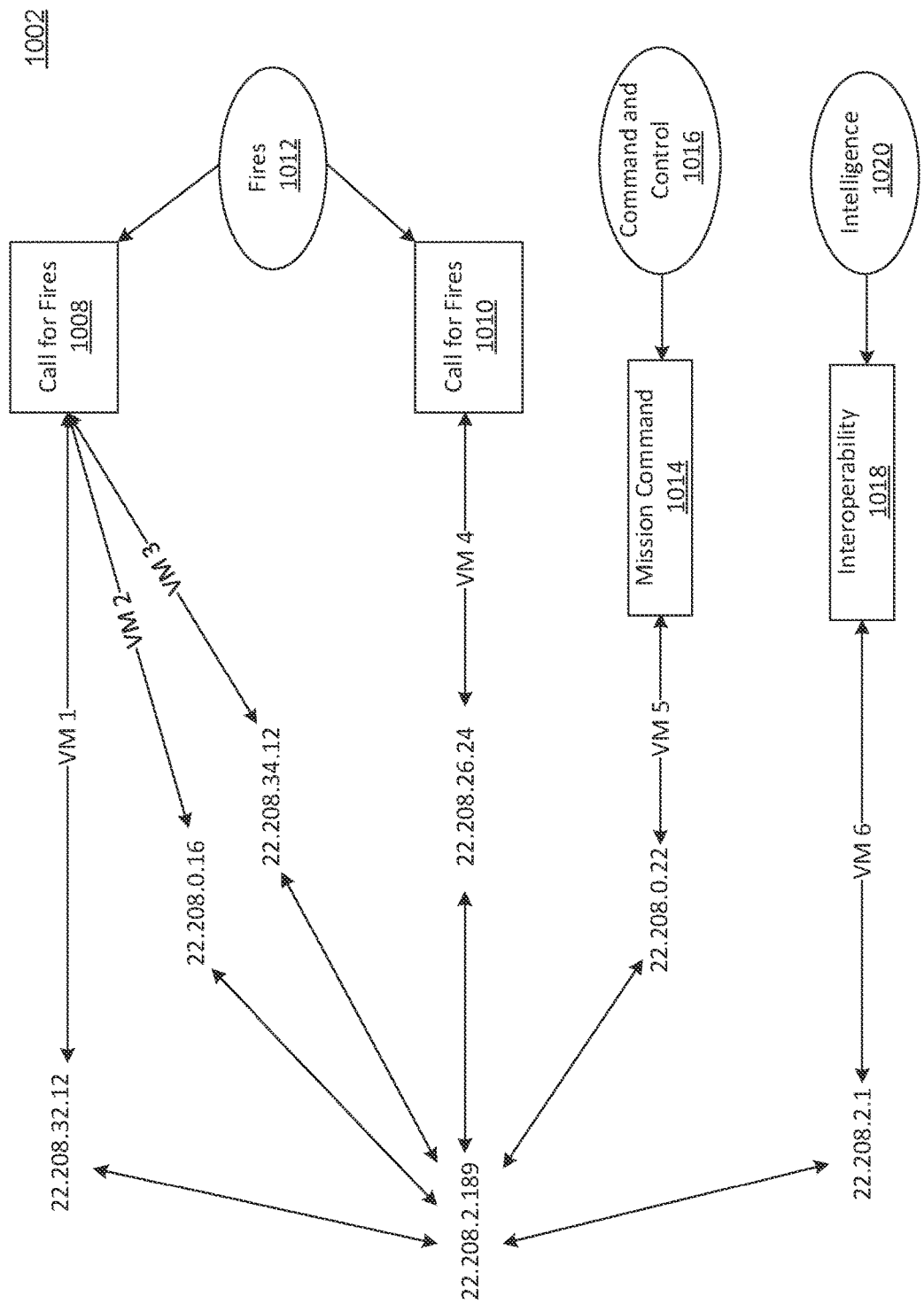

FIG. 10B shows associated impacts from suspicious service IP address 22.208.2.189 on, for example, warfighting functions. Impacted warfighting functions and services are highlighted in tree views 1002. Warfighting functions may depend on virtual machines (with particular IP addresses) that are potentially compromised, along with the network services that contribute to these potential attack impacts.

As shown, call for fires 1008 (orders for firing of, for example, missiles (war fighting equipment fires 1012), processed by VMs 1, 2 and 3 are potentially compromised through communications between 22.208.2.189 and IP addresses 22.208.32.12, 22.208.0.16 and 22.208.34.12, respectively. Call for fires 1010 (war fighting equipment fires 1012), communicated with 22.208.26.24 (VM 4) is also potentially compromised. Mission command 1014 may also be compromised through 22.208.0.22 (VM5) and lastly, Interoperability 1018 may have potentially compromised intelligence 1020 from this suspicious IP address.

While shown for war fighting functions, any operational objective may be substituted without departing from the scope of the technology described herein. In a non-limiting example, the nodes and edges may be delivery vehicles with locally connected devices, such as scanners, smartphones, laptops, cameras, vehicle internal computing devices as well as connections to other delivery vehicles or dispatch. The operational objective may be monitoring delivery locations and times. In addition, while cyber-threats may be of a strong interest to a supervisor reviewing the network, other issues, such as interoperability (between vehicles/devices) or communications/device failures may be also be discovered using the technology described herein. For example, if the ingested data includes computing device status, when that status is changed to "off" or "disconnected", it may suggest a device failure.

Figure 10C:
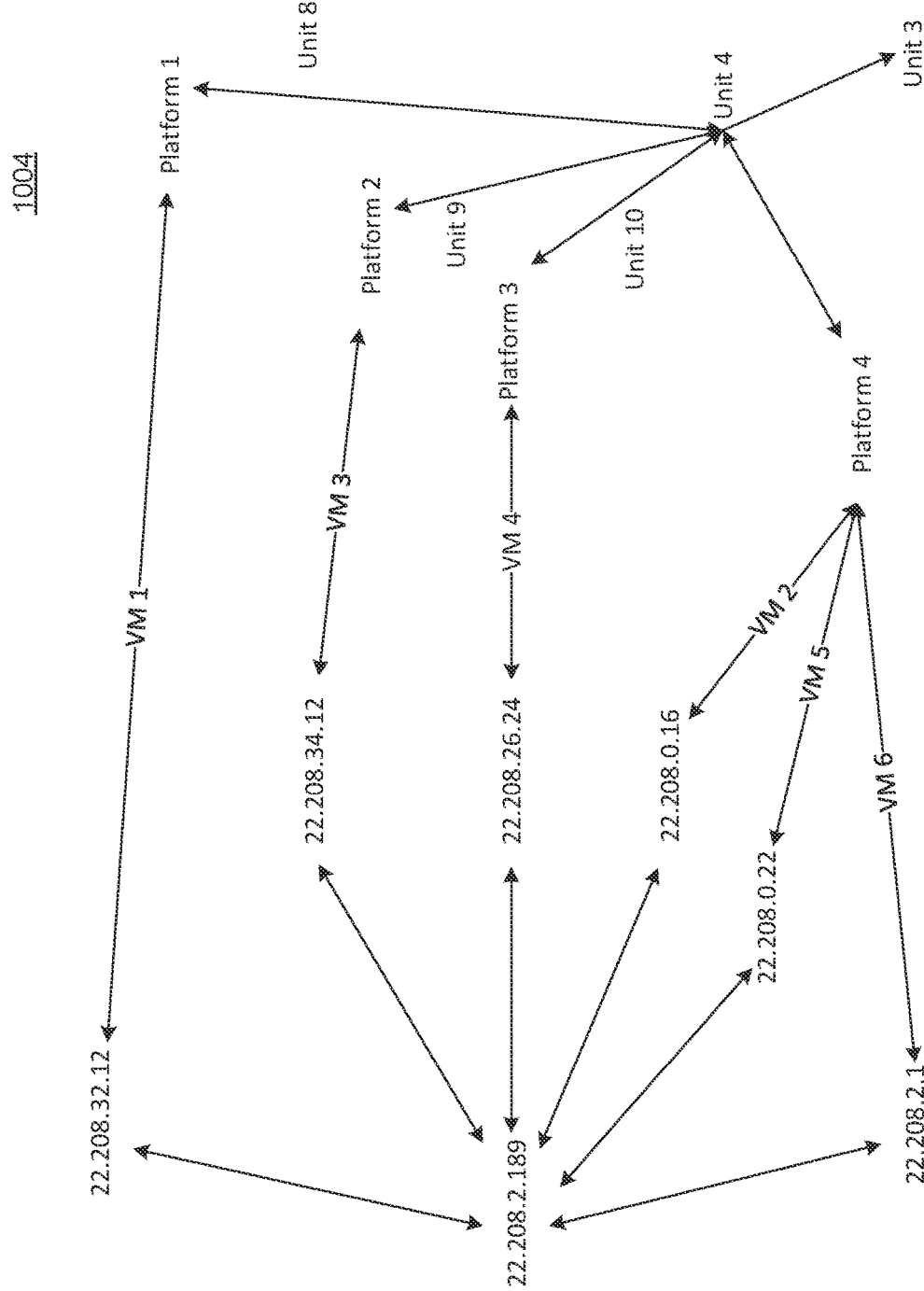

FIG. 10C allows visualization of platforms and units as highlighted on COP terrain maps as shown in FIG. 7. As shown, platforms 1, 2 and 3 (and units 8, 9 and 10 (directly) and units 4 and 3 (indirectly)) are potentially compromised through communications between 22.208.2.189 and IP addresses 22.208.32.12, 22.208.34.12 and 22.208.26.24 (VMs 1, 3 and 4, respectively). Platform 4 (and unit 4 (directly) and unit 3 (indirectly)) are also potentially compromised through communications between 22.208.2.189 through IP addresses 22.208.0.16, 22.208.0.22 and 22.208.2.1 (VMs 2, 5 and 6, respectively).

The system enables tactical commanders and staff, or any level of military or nonmilitary project controller, to better understand the cyberspace domain and how cyber events impact mission elements across warfighting functions in time and space. In this way, it provides the "so what" of cyber events for tactical operations.

One benefit of the technology described herein is an improvement to the computer system (computer network) security by visualization of cyber-asset threats.

Another benefit of the technology described herein is generation of various dashboards supporting cyber SU at the appropriate levels of detail for understanding cyber-asset dependencies (e.g., within a specific geography or warfighter environment). This includes a cyber-overlay onto a COP view as well as more detailed views driven by ad hoc analytic queries, integrated within core infrastructure supporting operations.

Another benefit of the technology described herein is an ability to extract and graphically display complex cyber-interrelationships and operational dependencies into a common graphical overlay with cyber-graph drill downs.

Figure 11:
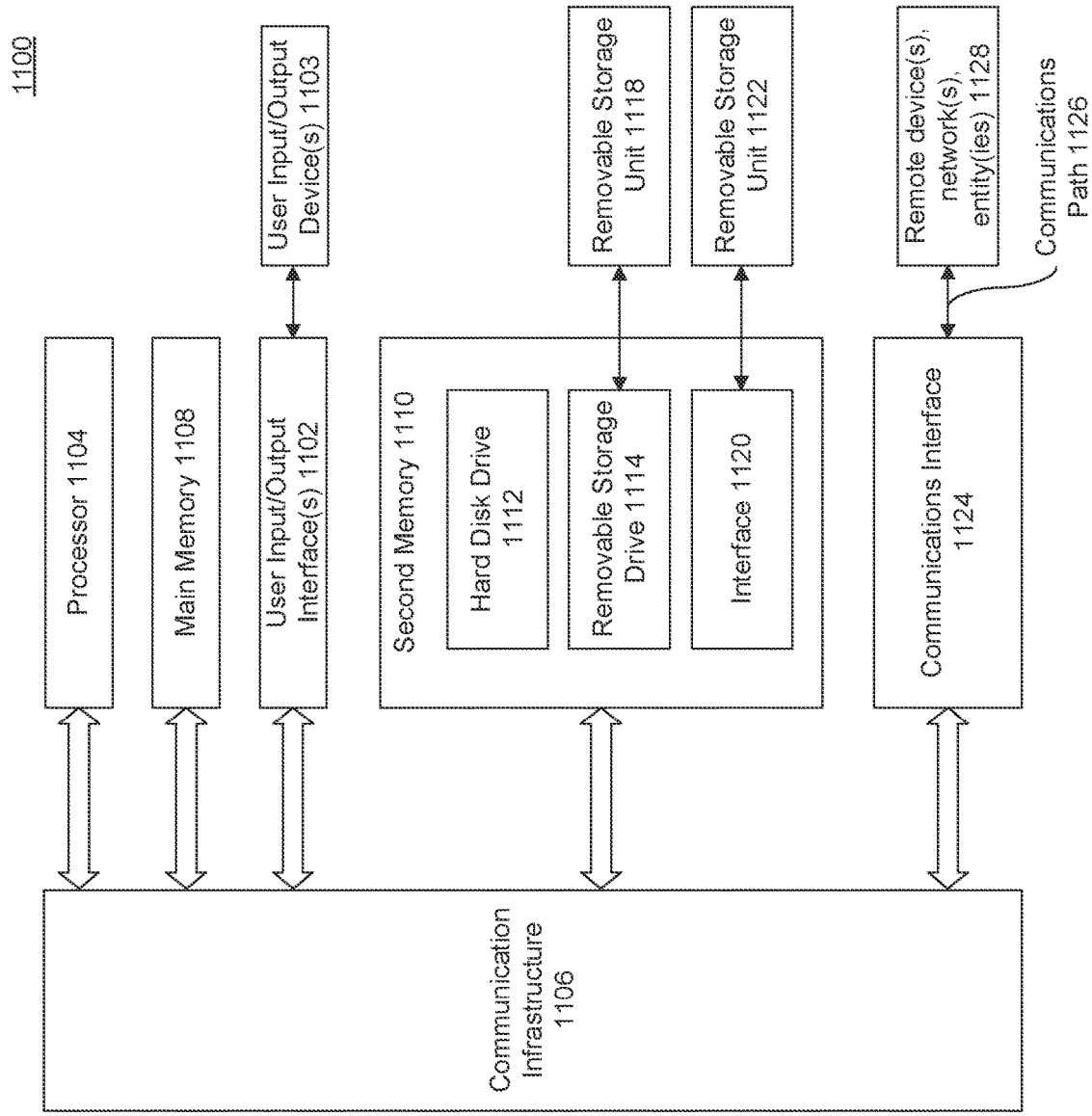
FIG. 11 is an example computer system useful for implementing various embodiments.

Various embodiments can be implemented, for example, using one or more computer systems, such as computer system 1100 shown in FIG. 11. Computer system 1100 can be used, for example, to implement method 400 of FIG. 4. Computer system 1100 can be any computer capable of performing the functions described herein.

Computer system 1100 can be any well-known computer capable of performing the functions described herein.

Computer system 1100 includes one or more processors (also called central processing units, or CPUs), such as a processor 1104. Processor 1104 is connected to a communication infrastructure or bus 1106.

One or more processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices (e.g., mobile computer devices), remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment." or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method comprising:
normalizing, by at least one processor, cyber information received for a plurality of cyberspace entities;
generating, by the at least one processor, cyber-graphs based on relationships between two or more of the plurality of cyberspace entities;
receiving, by the at least one processor, a cyber-threat inquiry of the cyber-graphs;
selecting, based on the cyber-threat inquiry, one or more cyber-graphs that represent impacts on a plurality of functions critical to organization mission operations associated with a plurality of selected IP addresses suspected to be compromised by a cyber-threat actor;
generating, by the at least one processor, a visualization of a result of the cyber-threat inquiry within a corresponding operational environment, wherein the visualization comprises one or more graphical layers rendered over imagery of a corresponding geographical environment; and
wherein at least one of the normalizing, generating, and receiving are performed by one or more computers.

2. The method of claim 1, further comprising:
aggregating the cyber-graphs into an active knowledge database.

3. The method of claim 2, the generating the cyber-graphs further comprising:
selecting the cyber-graphs related to the cyber-threat inquiry from the active knowledge database.

4. The method of claim 1, further comprising:
generating the cyber-threat inquiry by converting a natural language inquiry to a formal query language.

5. The method of claim 1, further comprising:
receiving location information associated with the plurality of cyberspace entities.

6. The method of claim 5, further comprising:
filtering the location information associated with the plurality of cyberspace entities to match a location of the corresponding operational environment.

7. The method of claim 1, the normalizing further comprising:
capturing the cyber information from streaming data.

8. The method of claim 1, further comprising:
configuring the one or more cyber-graphs as nodes represented by the plurality of cyberspace entities and edges represented by relationships between the plurality of cyberspace entities.

9. The method of claim 8, further comprising:
configuring the nodes to represent functions critical to the organization mission operations and further linking to nodes configured to represent network services used by the functions.

10. The method of claim 8, further comprising:
configuring the nodes to represent network services and further linking to nodes configured to represent virtual machines that are depended on by the network services.

11. The method of claim 8, further comprising:
configuring the nodes to represent network services and further linking to nodes configured to represent deployment platforms that are depended on by those network services.

12. The method of claim 8, further comprising:
configuring the nodes to represent organizational units and further linking to nodes configured to represent subordinate organizational units.

13. The method of claim 8, further comprising:
configuring the nodes to represent organizational units and further linking to nodes configured to represent deployment platforms that are contained by the organizational units.

14. The method of claim 8, further comprising:
configuring the nodes to represent deployment platforms and further linking to nodes configured to represent virtual machines that are managed by the deployment platforms.

15. The method of claim 8, further comprising:
configuring the nodes to represent virtual machines and further linking to nodes configured to represent unmanaged IP addresses assigned to the virtual machines.

16. The method of claim 8, further comprising:
configuring the nodes to represent virtual machines and further linking to nodes configured to represent managed IP addresses assigned to the virtual machines.

17. The method of claim 8, further comprising:
configuring the nodes to represent deployment platforms and further linking to nodes configured to represent unmanaged IP addresses assigned to the deployment platforms.

18. The method of claim 8, further comprising:
configuring the nodes to represent deployment platforms and further linking to nodes configured to represent managed IP addresses assigned to the deployment platforms.

19. The method of claim 8, further comprising:
configuring the nodes to represent unmanaged IP addresses and further linking to nodes configured to represent unmanaged IP addresses that receive network flows from the unmanaged IP addresses.

20. The method of claim 8, further comprising:
configuring the nodes to represent unmanaged IP addresses and further linking to nodes configured to represent managed IP addresses that receive network flows from the unmanaged IP addresses.

21. The method of claim 8, further comprising:
configuring the nodes to represent managed IP addresses and further linking to nodes configured to represent unmanaged IP addresses that receive network flows from the managed IP addresses.

22. The method of claim 8, further comprising:
configuring the nodes to represent managed IP addresses and further linking to nodes configured to represent managed IP addresses that receive network flows from the managed IP addresses.

23. The method of claim 8, further comprising:
configuring the nodes to represent unmanaged IP addresses and further linking to nodes configured to represent cyberattack alerts that are associated with the unmanaged IP addresses.

24. The method of claim 8, further comprising:
configuring the nodes to represent managed IP addresses and further linking to nodes configured to represent cyberattack alerts that are associated with the managed IP addresses.

25. The method of claim 1, further comprising:
selecting the one or more cyber-graphs that represent traffic communication for a plurality of the selected IP addresses.

26. The method of claim 1, further comprising:
selecting the one or more cyber-graphs that represent traffic communication for a plurality of the selected IP addresses suspected to be compromised by the cyber-threat actor.

27. The method of claim 1, further comprising:
selecting the one or more cyber-graphs that represent the impacts on a plurality of organizational units associated with a plurality of the selected IP addresses suspected to be compromised by the cyber-threat actor.

28. The method of claim 1, wherein the cyber information includes any of: network infrastructure, security posture, cyber threats, or operational dependencies.

29. The method of claim 1, wherein the plurality of cyberspace entities are represented as Internet Protocol (IP) addresses for virtual machines.

30. The method of claim 1, wherein the imagery of the corresponding geographical environment comprises a terrain map selected from satellite imagery.

31. A system, comprising:
a memory; and
at least one processor coupled to the memory and configured to:
normalize cyber information available for a plurality of cyberspace entities;
generate cyber-graphs based on relationships between two or more of the plurality of cyberspace entities;
receive a location-based cyber-threat inquiry of the cyber-graphs;
select, based on the location-based cyber-threat inquiry, one or more cyber-graphs that represent impacts on a plurality of functions critical to organization mission operations associated with a plurality of selected IP addresses suspected to be compromised by a cyber-threat actor;
generate a visualization of a result of the location-based cyber-threat inquiry; and
wherein the visualization comprises one or more graphical layers rendered over imagery of a corresponding geographical environment.

32. The system of claim 31, the at least one processor further configured to:
aggregate the cyber-graphs into an active knowledge database.

33. The system of claim 32, the at least one processor further configured to:
select the one or more cyber-graphs related to the location-based cyber-threat inquiry from the active knowledge database.

34. The system of claim 31, wherein the cyber information includes any of network infrastructure, security posture, cyber threats, or mission dependencies.

35. The system of claim 31, wherein the plurality of cyberspace entities are represented as Internet Protocol (IP) addresses for virtual machines.

36. The system of claim 31, wherein the cyber-graphs are configured as nodes represented by the plurality of cyberspace entities and edges represented by the relationships.

37. A non-transitory computer-readable device having instructions stored thereon that, when executed by at least one computing device, cause the at least one computing device to perform operations comprising:
receiving cyber information for a plurality of cyberspace assets;
generating cyber-graphs based on relationships between the plurality of cyberspace assets;
receiving a cyber-threat inquiry of the cyber-graphs;
selecting, based on the cyber-threat inquiry, one or more cyber-graphs that represent impacts on a plurality of functions critical to organization mission operations associated with a plurality of selected IP addresses suspected to be compromised by a cyber-threat actor;
generating a visualization of a result of the cyber-threat inquiry, wherein the visualization comprises one or more graphical layers rendered over imagery of a corresponding geographical environment; and
wherein the one or more graphical layers include a graph of the plurality of cyberspace assets and the relationships between the plurality of cyberspace assets.

38. The system of claim 31, wherein the imagery of the corresponding geographical environment comprises a terrain map selected from satellite imagery.

* * * * *